E. R. KNOWLES.
ART OF SEPARATING MATERIALS FROM GASES.
APPLICATION FILED FEB. 14, 1917.
Patented July 23, 1918.
7 SHEETS—SHEET 1.
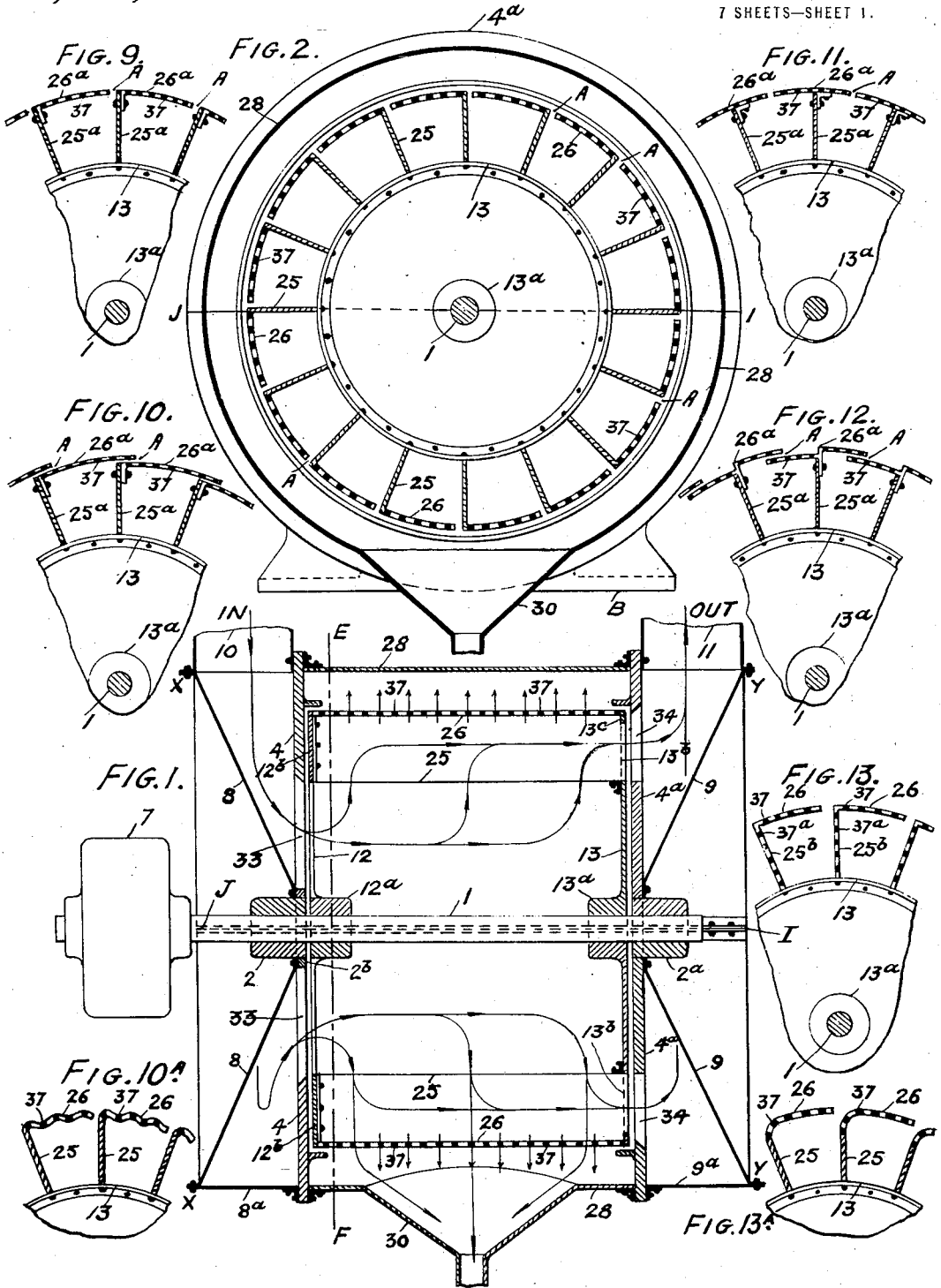
Inventor
Edward R. Knowles E. R. KNOWLES.
ART OF SEPARATING MATERIALS FROM GASES.
APPLICATION FILED FEB. 14, 1917.
1,273,791.
Patented July 23, 1918.
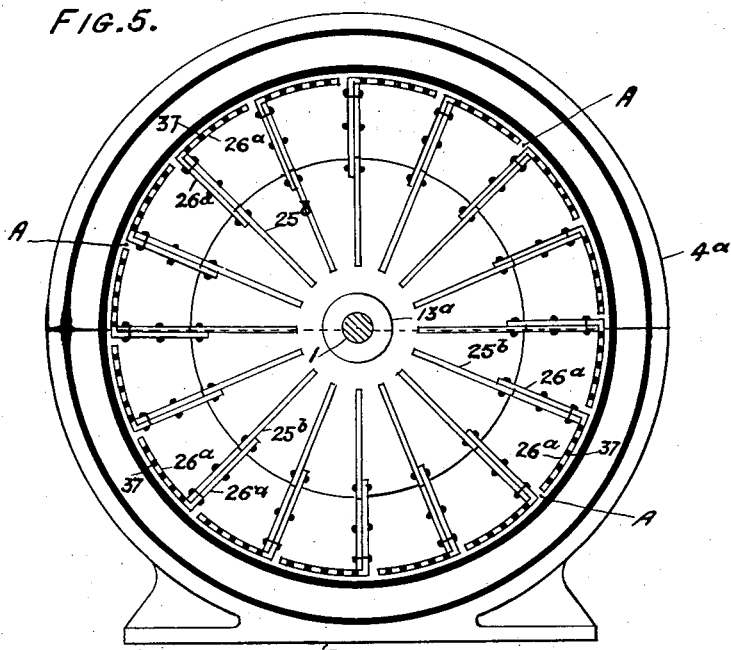
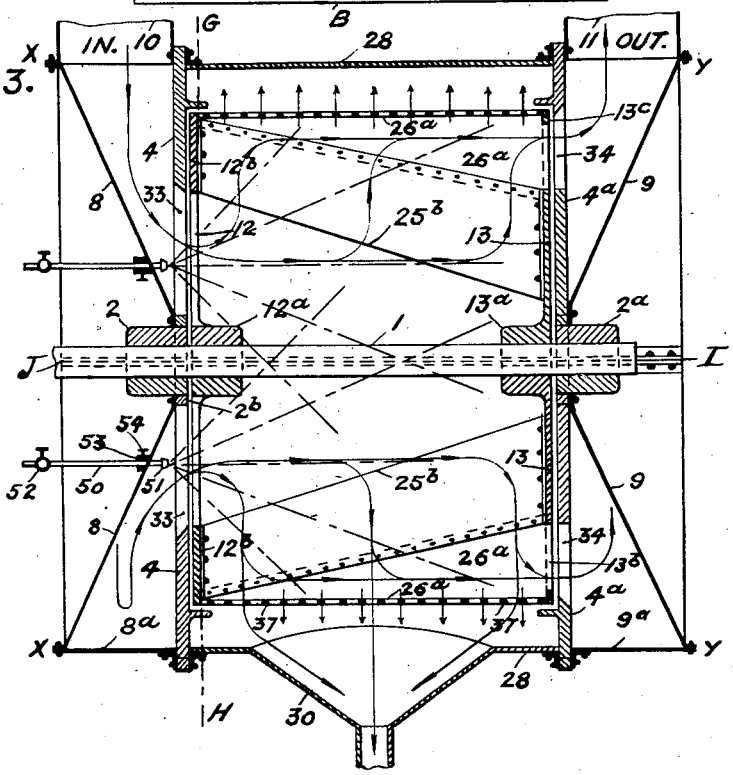
Inventor
Edward R. Knowles.

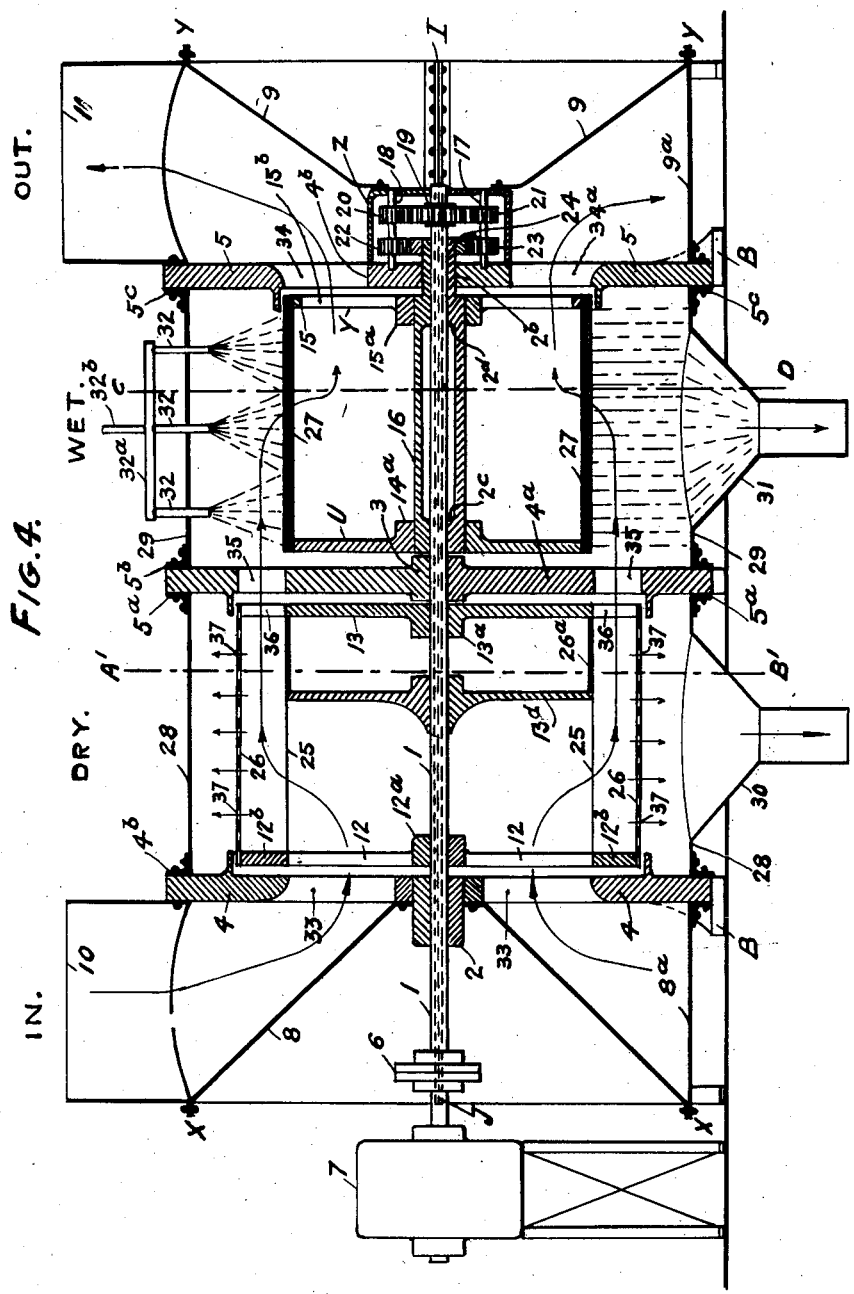

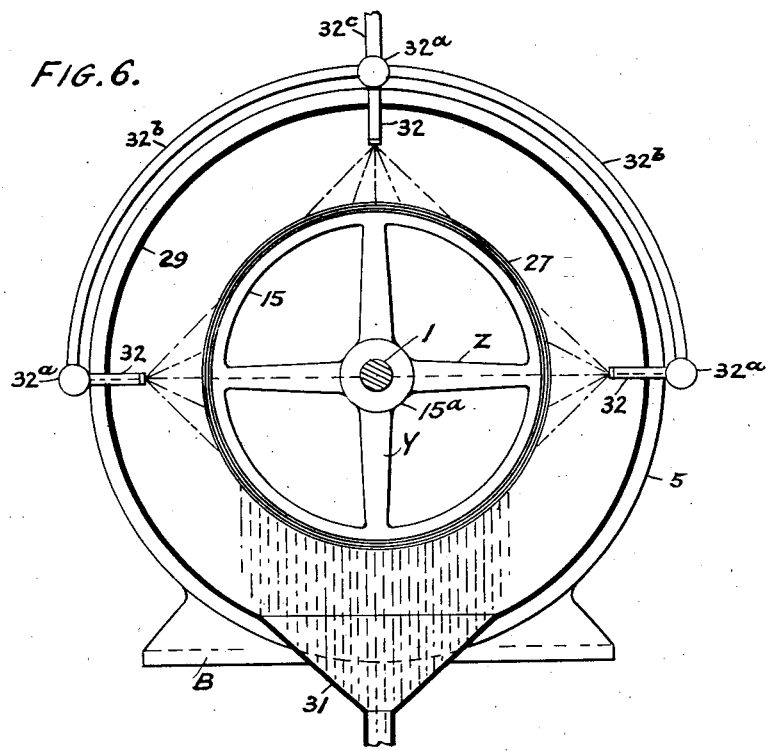
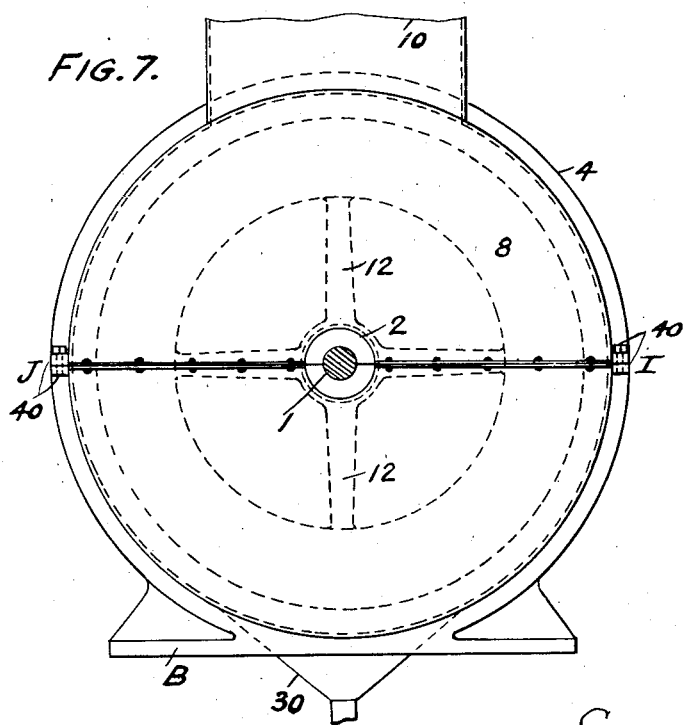

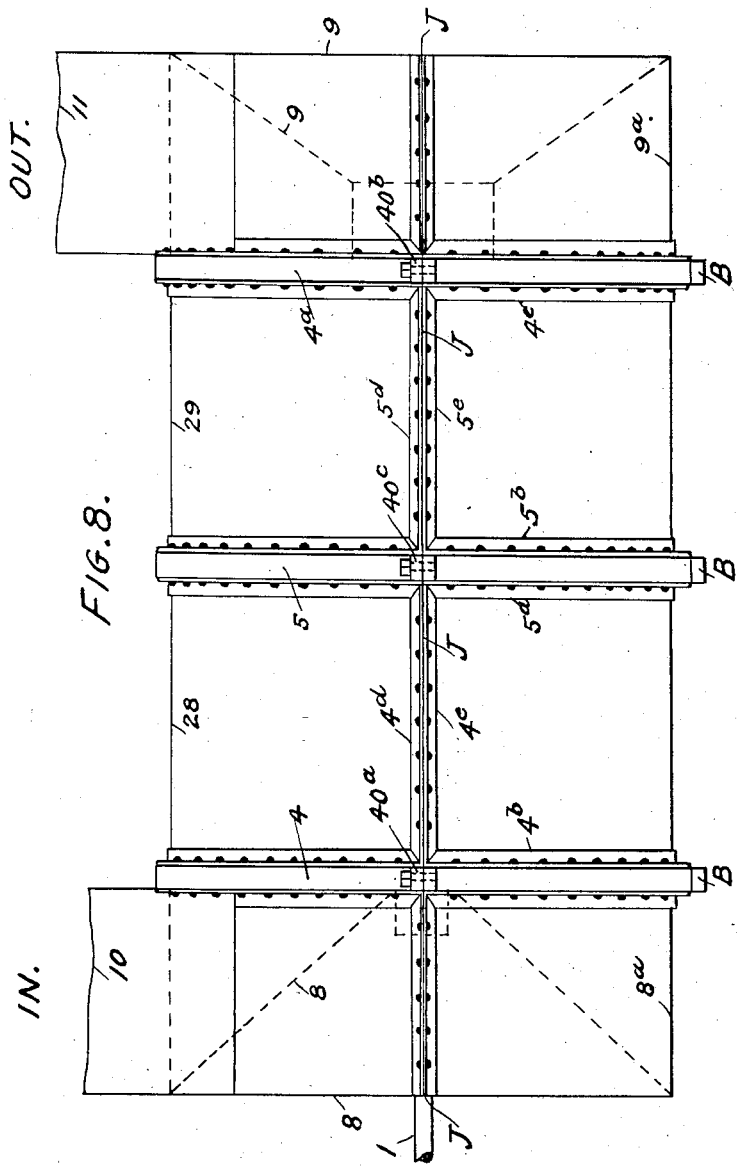

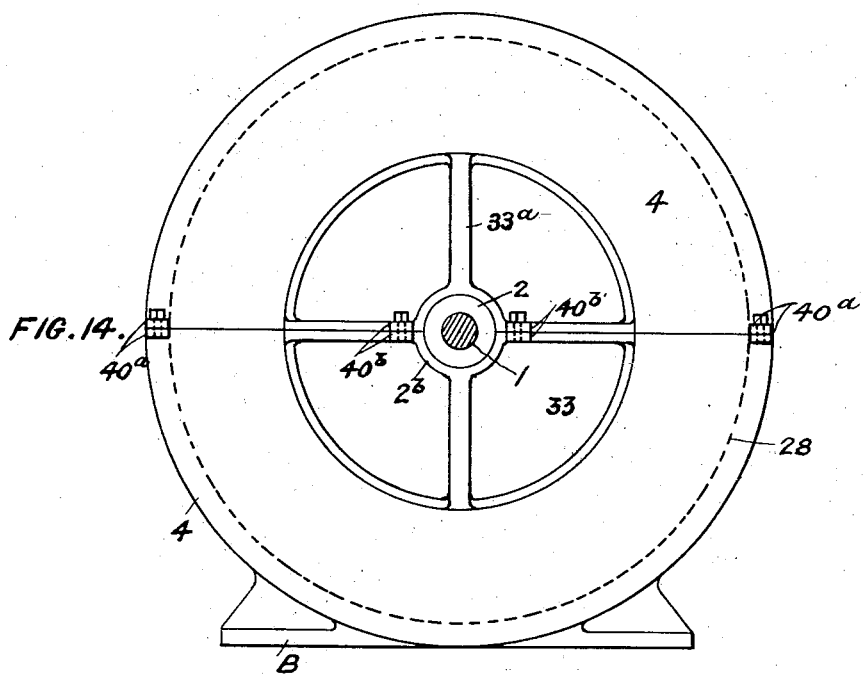
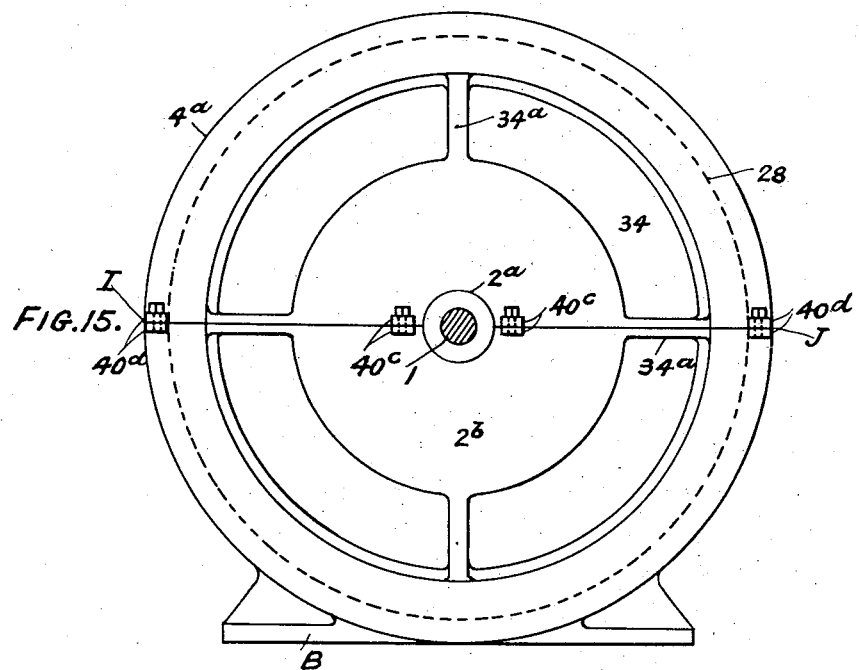

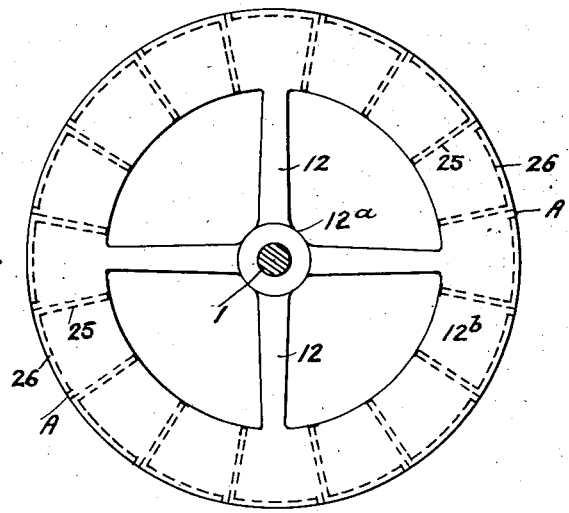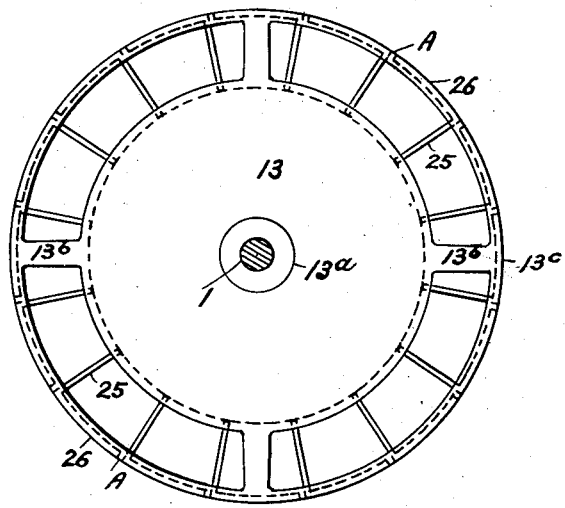

UNITED STATES PATENT OFFICE.

EDWARD R. KNOWLES, OF BROOKLYN, NEW YORK.

ART OF SEPARATING MATERIALS FROM GASES.

1,273,791.  Specification of Letters Patent.  Patented July 23, 1918.

Application filed February 14, 1917. Serial No. 148,612.

*To all whom it may concern:*

Be it known that I, EDWARD R. KNOWLES, a citizen of the United States, and a resident of the borough of Brooklyn, in the county of Kings and State of New York, have invented certain new and useful Improvements in the Art of Separating Materials from Gases, of which the following is a specification.

This invention relates to improvements in the art of separating materials from gases and includes both the process and the apparatus for applying the process.

The object of my invention is to purify air or gases by separating from them various finely divided solids suspended therein, such as unconsumed carbon and cinders from gases of combustion and smoke; dust, living organisms and germs thereof from air; various chemical compounds, fumes and finely divided metals and metallic compounds from the gases produced by various metallurgical and chemical processes; saw dust, marble dust, flour dust and other finely divided materials from the air of factories; finely divided manufactured materials such as sugar, powdered eggs and milk, from the containing gas or air; condensing and removing various substances such as acid fumes formed in the course of various manufactures and in general to separate any finely divided solid materials or condensable gases or acids from air or any gas and to do this in a highly efficient, economical and rapid manner.

In these specifications the term "gas" is used to include all gas including atmospheric air and the term "dust" to include all materials, whether solid or fluid to be separated from the gas.

Referring to the drawings which illustrate the apparatus and several modifications thereof by which the said process may be performed, in order to indicate the essential features of such apparatus, which essential features are, however, not restricted to any of the various details of construction which are illustrated, Figure 1 is a longitudinal vertical section of one form of my apparatus; Fig. 2 is a transverse vertical section of the same on the line E. F. Fig. 3 is a longitudinal vertical section of another form of my apparatus of which Fig. 5 is a transverse vertical section on the line G. H. Fig. 4 is a longitudinal vertical section of another form of my apparatus of which Fig. 2 is a transverse vertical section of the same on line A' B'. Fig. 6 is a transverse vertical section on line C. D., Fig. 4. Fig. 7 is an end elevation and Fig. 8 is a side elevation of the apparatus shown in Fig. 4. Figs. 9, 10, 11, 12, 13, 13$^a$ are various modifications of the fan blades shown in Figs. 1, 2, 3, 4 and 5. Figs. 14 and 15 are views of the end heads and Figs. 16 and 17 are views of the spiders carrying the fan blades.

Referring to Figs. 1, 3, 4, 14, 15, 1 is a shaft supported in bearings 2, 2$^a$ which are inserted and held in the heads 4, 4$^a$ in the manner hereafter described, 6 is a coupling and 7 a motor of any desired type.

Figs. 16 and 17 are fan blades supporting spiders shown in position in Figs. 1, 3, and 4, provided with hubs 12$^a$, 13$^a$ suitably secured to shaft 1. These spiders are composed of the hubs 12$^a$, 13$^a$ and arms 12, 13$^b$. The inlet spider, Fig. 16, has a rim 12$^b$ as shown, and the outlet spider, Fig. 17, has a rim 13$^c$ and an expansion of the hub 13$^a$ in a plate 13. Figs. 14 and 15 are heads, shown in position in Figs. 1, 3 and 4. these heads 4, 4$^a$ may be of cast iron or any suitable metal. The inlet head 4, Fig. 14, is formed with inlet openings 33, 33, bearing support 2$^b$ and arms 33$^a$, 33$^a$. The outlet head 4$^a$ Fig. 15, is formed with outlet openings 34, 34, bearing support 2$^b$ and arms 34$^a$, 34$^a$.

These heads act as supports for the shaft bearings, the inclosing shell or housing and the inlet and outlet flues, as shown in Figs. 1, 3, and 4. These heads are divided horizontally as shown, in Figs. 14, 15, the parts being provided with lugs 40$^a$, 40$^a$ on the inlet head 4, and 40$^d$, 40$^c$ on the outlet head 4$^a$ and are held together by bolts as shown.

The bearings 2 and 2$^a$ are of such a diameter that they make a tight fit in the openings in bearing supports 4$^a$ and 2$^b$ Figs. 1, 3, 14, 15, so that when the upper portions of heads 4, 4$^a$ are removed they can be placed in position in the lower portion after which the upper portion can be placed and bolted in position to the lower portion pinching the bearings between the upper and lower portions of the heads and holding them firmly and securely in place.

This construction provides for the removal of the upper portion of the apparatus without disturbing the bearings which will be held in place by the weight of the shaft, spiders and other portions supported thereby. 28, 29, Figs 1, 3, 4, 8, are the shells or housings inclosing the separator mechanism. These shells are cylindrical in form, constructed of sheet or cast metal, reinforced with angle iron rings 4ᵇ, 5ᵃ, 5ᵇ, 5ᶜ, Fig. 8. They are divided horizontally and longitudinally along the plane I. J. the edges being reinforced with angle irons 4ᶜ, 4ᵈ, 5ᵈ, 5ᵉ. These shells are held together by screw bolts and are fastened to heads 4, 5, 4ᵃ by screw bolts. By this construction, when it is desired to gain access to the interior or to remove the working parts, by removing the bolts in the heads and bolts in the shells, the entire upper portion of the heads and shells can be removed, exposing the interior mechanism and enabling it to be readily gotten at or removed if desired. The inlet and outlet ends are provided with cylindrical cone shaped flues or chambers 8, 8ᵃ, 9, 9ᵃ Figs. 1, 3, 4. These flues or chambers consist of cylindrical portions 8ᵃ and 9ᵃ and conical portions 8, 9. They are bolted together at their exterior edges X. Y. and are bolted to heads 4, 4ᵃ and bearings 2—2ᵃ as shown. These flues or chambers are divided horizontally in the plane I. J. and reinforced along this line with angle irons and bolted together on this line as shown. When it is desired to remove the upper half of the housing the bolts along plane I. J. are removed with the upper portion of the housing, thus enabling all of the interior mechanism to be removed in one piece if desired.

By this arrangement of cylindrical conical chambers or flues the bearings 2, 2ᵃ are outside of the flues, exposed to the air and readily accessible at all times and are not subjected to the heating or deteriorating effects of any hot gases or dusts which may be passing through the flues into and out of the separating mechanism. At the same time the flues, bearings, heads and shells form one solid and rigid support for the separating mechanism.

Attached to the spiders, Figs. 16, 17 as shown in Figs. 1, 3, 4, are the fan and dust separating blades, 25, 26 shown more in detail in Figs. 2, 5, 9, 10, 11, 12, 13 and 13ᵃ. These blades are of a special shape and construction having an L shaped cross section consisting of a radial or fan portion 25 and a circumferential or separator portion 26. They are suitably fastened in a radial position at the inlet end to the rim 12ᵇ and at the outlet end to the rim 13ᶜ and the plate 13. These fan and separator blades, as shown in Figs. 2, 5, are perforated along their outer or circumferential portion 26, called the separator portion, this portion being preferably curved to an arc of a circle whose radius is the distance from the center of the shaft to the outer end of the radial portion 25 of the blades. The circumferential or separator portion 26, of each fan and separator blade is of such a width that it leaves an open space A for the length of the blade, between it and the next blade, the arrangement being such that each fan or separator blade is independent of and does not touch the next or any other blade. These fan and separator blades may have various shapes and constructions as shown in Figs. 2, 5, 9, 10, 11, 12, 13, 13ᵃ. They may be formed in one piece having a solid radial portion 25 and a perforated circumferential portion 26, as shown in Figs. 2, 5, 10ᵃ, 13ᵃ and they may be made with a square angle as shown in Figs. 2, 5, 10ᵃ, 13, or with a rounded angle as shown in Fig. 13ᵃ. They may be formed in one piece having both the radial portion 25ᵇ and circumferential portion 26 perforated as shown in Fig. 13. Instead of being made in one piece the fan and separator blades may be made in two pieces, a radial portion 25ᵃ and a circumferential portion 26ᵃ, the circumferential portion being removably attached to the radial portion as shown in Figs. 5, 9, 10, 11, 12 and the circumferential portions 26ᵃ may be made long enough to overlap each other leaving an opening A between them as shown in Figs. 10, 12. They may also be made as shown in Fig. 12, the circumferential portion being so placed that the opening A between it and the next comes in the middle of the space between two radial portions.

By this separable arrangement, in case of wear or corrosion of the circumferential portion 26ᵃ of the blades, these portions can be readily removed and new parts substituted.

In Fig. 3 is shown a form, having longitudinally inclined radial portions 25ᵇ to which are removably bolted the circumferential portions 26ᵃ Figs. 3 and 5.

This separable form of blade construction also permits of any form of centrifugal fan being changed into a dust separating fan by suitably attaching to the outer end of each fan blade a perforated circumferential portion as shown in Fig. 1, which is the American blower form of fan and in Fig. 3, which is the Buffalo forge form of fan.

At the bottom of the housing or casing is a funnel outlet 30 through which the collected dust or other material can pass out of the separator to a suitable receptacle or holder for the same.

The operation of this apparatus is as follows:—

When the combined shaft 1, spiders 12 and 13 and fan and separator blades 25, 26, are rotated by a suitable motor 7, the air or gas and its dust content are drawn, by the action of the fan and separator blades, through inlet flue 10 and openings 33, 33, into the interior of the fan, as shown by the arrows, Figs. 1, 3, 4. The centrifugal action of the fan portion 25 of the blades forces the air or gas and its dust content out radially against the perforated circumferential portion 26 of the blades. The dust content passes through the perforations 27 in the separator portion 26 of the blades and through the opening A between the blades into the space between the fan surface 26 and the shell 28, and thence falls by gravity to the bottom of the housing 28 and out through the conical outlet 30 at the bottom. See Figs. 1, 3, 4.

The air or gas does not pass through the perforated separator portions 26, 26 of the blades because the air or gas in the space between the housing 28 and the fan and separator blades 25, 26, is in an inclosed space and is at the same pressure as the air or gas in the interior of the fan. Its direction of flow is changed and it passes, freed from its dust contents out through the openings 34, 34 into and through flue 11.

The separator so far described is what may be termed a "dry" separator, the dust being eliminated from the air or gas without the use of water spray In some cases, the dust may be so fine and light as not to have sufficient weight to be sufficiently acted upon by the centrifugal force, in which case a water spray is necessary to moisten and add weight to the dust particles.

50, 51, Fig. 3 is a water pipe and jet controlled by a valve 52. When the valve is open the water is forcibly projected in a fine spray into the interior of the fan, intimately commingling with the gas and dust, moistening the dust and adding weight thereto.

There may be several of these water jets as shown and they are so arranged as to be adjustable by being drawn in or out through the bushings 53 and held in position by set screws 54.

In Fig. 4, I have shown a form of combined "dry" and "wet" separator. This separator consists of two parts, the left hand or dry part, is similar in its construction to the separator shown in Figs. 1 and 2, the only difference being the addition of an intermediate diaphragm 13$^d$ and drum 26$^a$ which serves to reduce the space in the interior of the fan chamber and increase the length of the outlet passage 36.

The head 4$^a$ in Figs. 1 and 3 becomes a central bearing head 3 in Fig. 4, dividing the "dry" portion of the separator from the right hand or "wet" part. 5 is an outlet head formed with outlet openings 34, 34, bearing support 4$^b$ and arms 34$^a$, 34$^a$, similar in construction and arrangement to the outlet head shown in Fig. 15. Shaft 1 is continued through bearing 3 and through head 5 as shown.

U and Y are spiders, secured to and carried by quill 16; U being solid and Y consisting of a rim 15, a hub 15$^a$ and arms 15$^b$, 15$^b$. 27 is a porous drum, consisting of layers of wire mesh or other suitable filtering material, which is removable attached to and carried by the spiders U and Y. 29 is a housing or shell shown in Figs. 4 and 8 and is constructed and arranged as already described. 9, 9$^a$ and 11 is a cylindrical conical head and flue, constructed and arranged as already described and removably bolted to head 5 and box Z as shown. Z is a box inclosing a speed reducing mechanism consisting of a pinion 19, gears 22—23, meshing with pinion 24 carried by 2$^b$. Gears 20, 22 are carried by a shaft 18 and gears 21, 23 are carried by shaft 17. Shafts 17 and 18 have bearings in head 5 and box Z. These gears are so proportioned that the speed of shaft 1 is reduced to any desired rate. By this or other speed reducing mechanism, the drum 27 can be caused to revolve at a low rate of speed while the fan 25, 26 is revolving at a high rate of speed.

32, 32, 32, are water sprays jets passing through casing 29 and connected to the water feed pipes 32$^a$, 32$^b$. 31 is a conical outlet at the bottom of the apparatus through which the mingled dust and water passes off.

The operation of the apparatus is as follows: See Figs. 1, 3, 4.

The gas and its dust content are drawn through inlet flue 10, 8 into the interior of the fan chamber from which by the centrifugal action of fan blades 25 it is forced out against the perforated separator portion 26 of the fan blades 25. All of the dust which can be separated "dry" passes through the perforations in 26 and the very fine dust together with the gas passes through outlet 35 into the space between housing 29 and filter drum 27. The gas is forced through filter drum 27 the surface of which is continuously wet by the water sprays 32, 32, 32. The dust is mingled with the water spray and is arrested and retained on the surface of drum 27 from which it is washed off by the water from the water sprays, falling to the bottom of the housing and passing out through conical opening 31 while the gas, freed from its dust content passes out from the interior of drum 27 through its open end and outlet openings 34, 34, in head 5, into and through outlet flue 9, 9$^a$, 11.

It should be understood that I do not desire to be limited to the exact details of construction shown and described as I am aware that modifications and changes in the construction, arrangement and combinations of the various parts of my device can be made and substituted for those herein shown and described without departing from the nature and principle of my invention.

Having thus described my invention, what

I claim as new, and desire to secure by Letters Patent, is:—

1. In an apparatus for separating gas and heavier materials, the combination of a stationary chamber, an inlet thereto, and outlet therefrom and a centrifugal fan therein, whose blades are composed of a solid radial portion and a perforated circumferential portion, the radial portion extending inwardly from the circumferential portion and the circumferential portion having an opening between its edge and the next adjoining portion, substantially as described.

2. In an apparatus for separating gas and heavier materials, the combination of a stationary chamber, an inlet thereto, an outlet therefrom and a centrifugal fan therein, whose blades are composed of a perforated radial portion and a perforated circumferential portion, the radial portion extending inwardly from the circumferential portion and the circumferential portion having an opening between its edge and the next adjoining portion, substantially as described.

3. In an apparatus for separating gas and heavier materials, the combination of a stationary chamber, an inlet thereto, and outlet therefrom and a centrifugal fan therein whose blades are composed of a solid radial portion and a perforated circumferential portion, each circumferential portion overlapping the next adjoining portion and having an opening between the overlapping portion and the next adjoining portion, substantially as described.

4. In an apparatus for separating gas and heavier materials, the combination of a stationary chamber, and inlet thereto, an outlet therefrom and a centrifugal fan therein, whose blades are composed of a solid radial portion and a perforated circumferential portion, the radial portion and the circumferential portion being joined by a curved portion and the circumferential portion having an opening between its edge and the next adjoining portion, substantially as described.

5. In an apparatus for separating gas and heavier materials, the combination of a stationary chamber, an inlet thereto, an outlet therefrom and a centrifugal fan therein whose blades are composed of a solid radial portion and a perforated circumferential portion the radial portion being wedge shaped and extending inwardly from the circumferential portion and the circumferential portion having an opening between its edge and the next adjoining portion, substantially as described.

6. In an apparatus for separating gas and heavier materials, the combination of a stationary chamber, an inlet thereto, an outlet therefrom and a centrifugal fan therein, whose blades are composed of a solid radial portion and a perforated circumferential portion, the radial portion extending inwardly from the circumferential portion, the circumferential portion being corrugated and having an opening between its edge and the next adjoining portion, substantially as described.

7. In an apparatus for separating gas and heavier materials, the combination of a stationary chamber, an inlet thereto, an outlet therefrom and a centrifugal fan therein whose blades are composed of a solid radial portion and a perforated circumferential portion with an opening between the edge of each circumferential portion and the next adjoining portion, substantially as described.

8. In an apparatus for separating gas and heavier materials, the combination of a stationary chamber, an inlet thereto, and outlet therefrom and a centrifugal fan therein whose blades are composed of a solid radial portion and a perforated circumferential portion adapted to permit the passage therethrough of said heavier materials, said fan having an internal space open from end to end thereof adapted for the passage of gas therethrough, substantially as described.

Signed at New York, in the county of New York and State of New York, this 10th day of February, A. D. 1917.

EDWARD R. KNOWLES.